United States Patent [19]

Furukawa et al.

[11] Patent Number: 4,934,989
[45] Date of Patent: Jun. 19, 1990

[54] BELT TRANSMISSION

[75] Inventors: Kazuo Furukawa; Keiichi Sampei; Yoshihiro Kato; Yosihito Dei; Katsumi Fukumoto, all of Osaka, Japan

[73] Assignee: Kubots, Ltd., Osaka, Japan

[21] Appl. No.: 329,522

[22] Filed: Mar. 28, 1989

[30] Foreign Application Priority Data

Mar. 28, 1988 [JP] Japan .............................. 63-41635[U]

[51] Int. Cl.⁵ .............................................. F16H 7/08
[52] U.S. Cl. .................................................. 474/135
[58] Field of Search ...................... 474/101, 109–111, 474/113–117, 133, 135, 136, 138; 56/11.3, 11.6; 188/24.14, 24.18; 192/5, 7, 11, 13 R, 13 A

[56] References Cited

U.S. PATENT DOCUMENTS

| 976,115 | 11/1910 | Bard ................................ 474/135 X |
| 2,945,393 | 7/1960 | Paulson ............................ 474/135 X |
| 3,811,332 | 5/1974 | Brown et al. .......................... 474/111 |

FOREIGN PATENT DOCUMENTS 0031759 2/1987 Japan ................................ 474/135

Primary Examiner—Thuy M. Bui

[57] ABSTRACT

A belt transmission in which a transmission belt is reeved around each of a reversible drive pulley and a driven pulley and which includes a pair of tension pulleys provided respectively on the taut side and the slack side of the belt in contact therewith. The two tension pulleys are biased by an elastic body to tension the belt. A first link is connected to one of the tension pulleys, and a second link to the other tension pulley. The two links are each pivotally movable in a direction for the corresponding tension pulley to tension the belt and in a direction for the tension pulley to relieve the tension. The two links are pivotally movable about a common axis. When the direction of rotation of the drive pulley is changed, reversing the taut side and the slack side of the belt, the tension imparted to the belt by the tension pulleys is automatically adjusted properly by the pivotal movement of the two links.

23 Claims, 8 Drawing Sheets

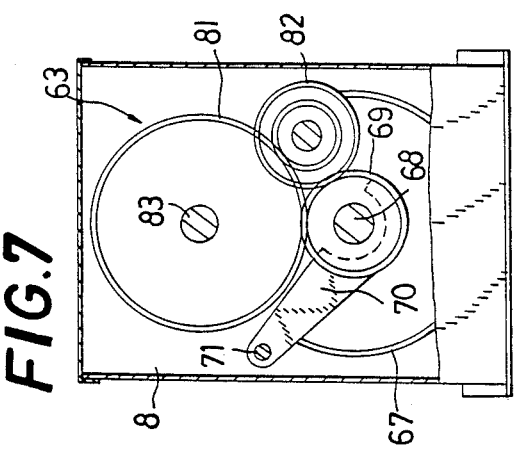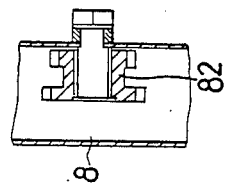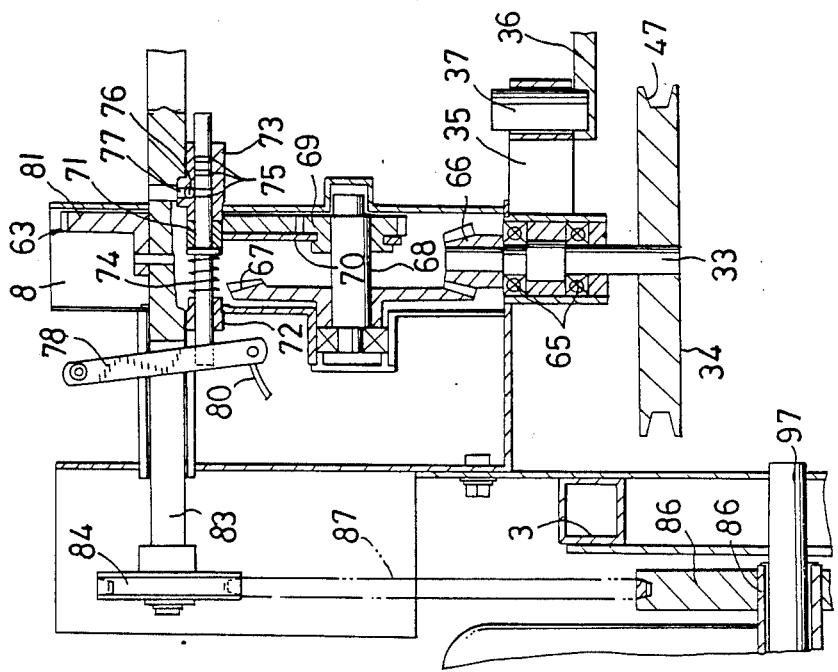

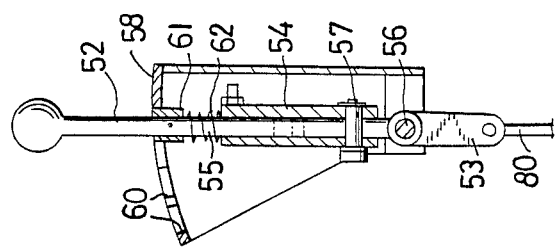
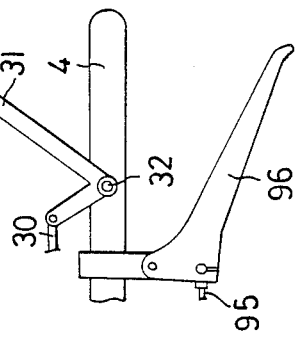
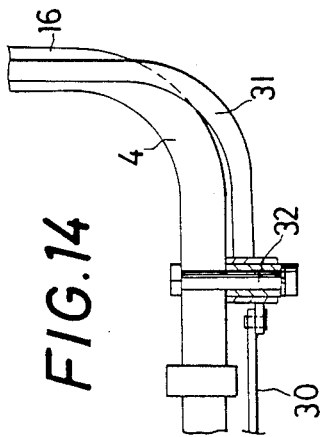

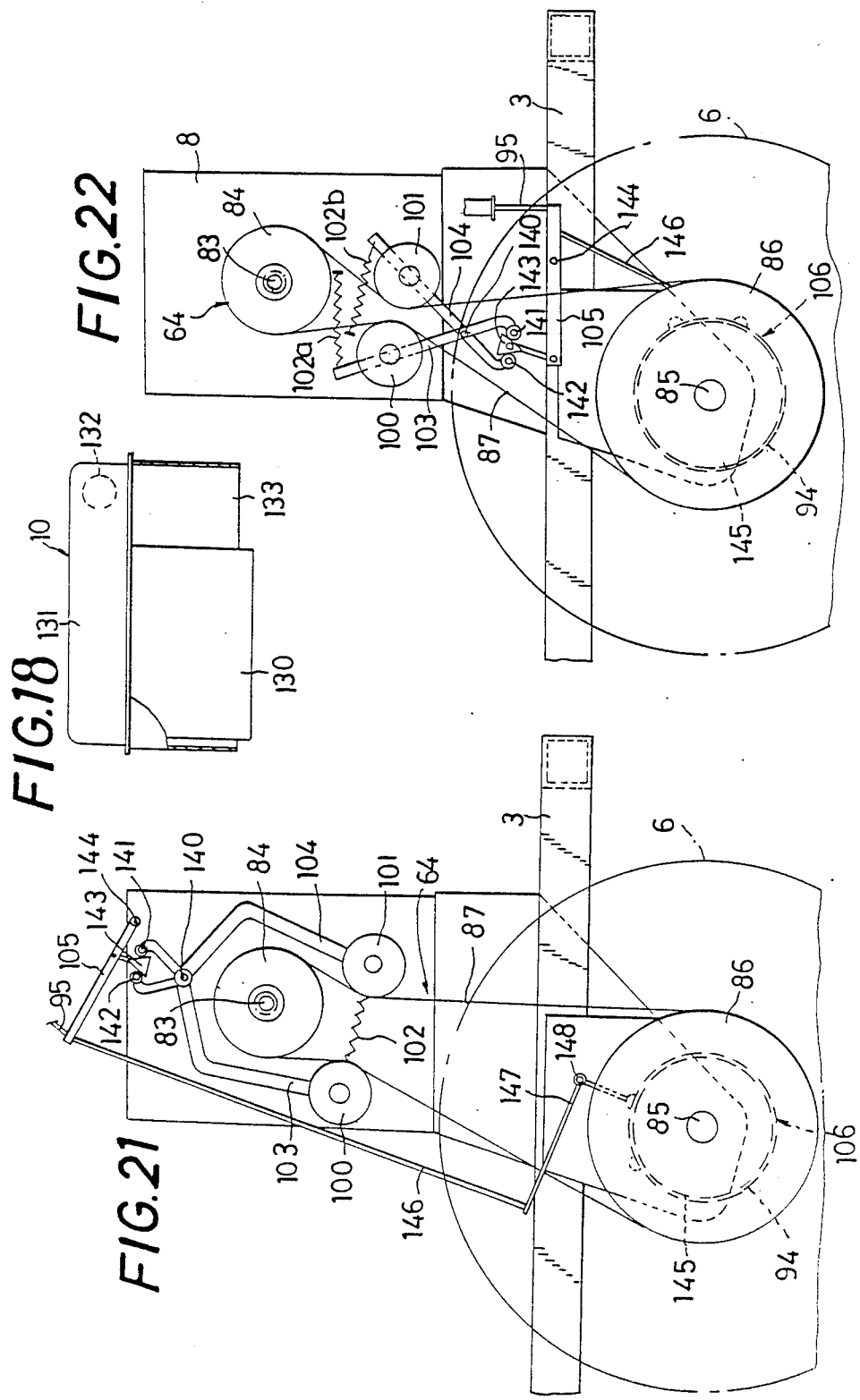

BELT TRANSMISSION

FIELD OF THE INVENTION AND RELATED ART STATEMENT

The present invention relates to belt transmissions which are adapted to selectively trasmit rotation forwardly or reversely and in which a belt is tensioned by tension pulleys.

It has been the conventional practice with belt transmissions to tension the belt by tension pulleys to ensure proper power transmission from the drive pulley to the driven pulley.

When the belt is bent or deflected by two tension pulleys to tension the belt, the amount of deflection of the belt differs between the taut side of the belt and the slack side thereof even when the same proper tension is given to the two sides.

When the direction of rotation of the drive pulley is changed to reverse the direction of transmission of torque, the taut side and the slack side change, and there arises a need to shift the tension pulleys relative to the belt.

OBJECTS AND SUMMARY OF THE INVENTION

However, it is cumbersome to shift the tension pulleys every time the direction of rotation is changed. Moreover, this makes the transmission complex in construction.

Accordingly, an object of the present invention is to provide a belt transmission wherein the tension to be imparted to the belt by the tension pulleys can be maintained properly automatically when the direction of transmission of torque is changed.

Another object of the invention is to provide such a belt transmission which has incorporated therein a clutch mechanism and a brake device in combination to give improved usefulness to the mechanism.

To fulfill these objects, the present invention provides a belt transmission wherein a transmission belt is reeved around a reversible drive pulley and a reversible driven pulley comprising a tension pulley provided in contact with the taut side of the transmission belt and movable in a first direction to tension the belt and in another direction to relieve the belt of the tension, a tension pulley provided in contact with the slack side of the transmission belt and movable in a direction to tension the belt and in another direction to relieve the belt of the tension, an elastic body biasing the two tension pulleys each in the belt tensioning direction, a first link connected to one of the tension pulleys, and a second link connected to the other tension pulley, each of the two links being pivotally movable in the direction for the corresponding tension pulley to tension the transmission belt and in the direction for the tension pulley to relieve the tension, the two links being pivotally movable about a common axis.

According to the invention, the two tension pulleys in contact with the taut side of the belt and the slack side thereof respectively are each movable in the tensioning direction and also in the tension relieving direction. Consequently, when the direction of revolution of the belt is changed to result in a change-over between the taut side and the slack side, the tension pulley in contact with the belt portion changing from the taut side to the slack side moves toward the tensioning direction, and the other tension pulley in contact with the belt portion changing from the slack side to the taut side moves toward the tension relieving direction. With this movement of the tension pulleys, the first link and the second link pivotally move about the common axis, whereby the tension exerted on the belt by the elastic body through the tension pulleys is automatically adjusted properly despite the change in the direction of revolution. Further when the two tension pulleys move in the tension relieving direction, power transmission from the drive pulley to the driven pulley is interrupted. Thus, the tension pulleys function as clutch means.

Preferably, the two links are pivotally movable without changing the angle thereof relative to each other when the direction of revolution of the transmission belt is changed.

The two tension pulleys are connected together by the elastic body which is in the form of a single member. Alternatively, the two tension pulleys may be individually biased by separate elastic bodies.

A coupling member, when operatively connected to the first and second links, enables the operator to readily operate the two tension pulleys more readily as clutch means. Preferably, in this case, a third link is connected to one of the tension pulleys, and a fourth link to the other tension pulley. The third link and the fourth link are connected together and pivotally movable relative to each other. The coupling member is operatively connected to the first link and the second link by the third link and the fourth link. Further preferably, the first link and the second link are provided, each at its one end, with the respective tension pulleys, and each of the first and second links has a roller mounted on the other end thereof. A cam is held between the rollers and has the coupling member operatively connected thereto. In this case, the cam and a pivot having the common axis and supporting the first link and the second link are positioned inside or outside the transmission belt.

Preferably, a brake device is provided which has a brake member for braking the driven pulley when the belt is relieved of the tension to be imparted by the tension pulleys with power transmission from the drive pulley to the driven pulley discontinued. With the brake member operatively connected to the coupling member, the brake device can be operated very easily.

As a useful application, the driven pulley is operable for driving a wheel of a vehicle, which, for example, can be a mower.

Stated more specifically, the present invention provides a belt transmission wherein a transmission belt is reeved around a reversible drive pulley and a reversible driven pulley comprising a tension pulley provided in contact with the taut side of the transmission belt and movable in a direction to tension the belt and in another direction to relieve the belt of the tension, a tension pulley provided in contact with the slack side of the transmission belt and movable in a first direction to tension the belt and in another direction to relieve the belt of the tension, an elastic body biasing the two tension pulleys each in the belt tensioning direction, a first link connected to one of the tension pulleys, and a second link connected to the other tension pulley, each of the two links being pivotally movable in the direction for the corresponding tension pulley to tension the transmission belt and in the direction for the tension pulley to relieve the tension, the two links being pivotally movable about a common axis, the driven pulley being operable to drive a rear wheel of a mower of the walk-behind type, the mower having front wheels serving as gauge wheels and a handle provided at its rear portion for the operator, the drive pulley being positioned above the driven pulley.

The mower having the belt transmission of the construction stated above is useful because when the course of travel is to be changed, the operator usually depresses the handle to raise the front wheels and then turns the mower as supported by the rear wheels to prevent the front wheel from scalping the ground. During this procedure, the belt is precluded from coming into contact with the ground since the drive pulley is positioned above the driven pulley.

BRIEF DESCRIPTION OF THE DRAWINGS

The drawings show embodiments of the invention.

FIG. 6 is a rear view in section of a transmission case;

FIG. 7 is a side elevation in section of the same;

FIG. 8 is a view showing a back gear as installed in place;

FIG. 10 is an overall side elevation of the same;

FIG. 12 is a rear view in section of the same;

FIG. 14 is a fragmentary plan view of a handle;

FIG. 15 is a fragmentary side elevation of the same;

FIG. 18 is a rear view partly broken away and showing a clipping container of the mower; and FIGS. 19 to 22 are side elevations of different modified steering belt transmissions.

DESCRIPTION OF THE PREFERRED EMBODIMENTS

Figure 9:
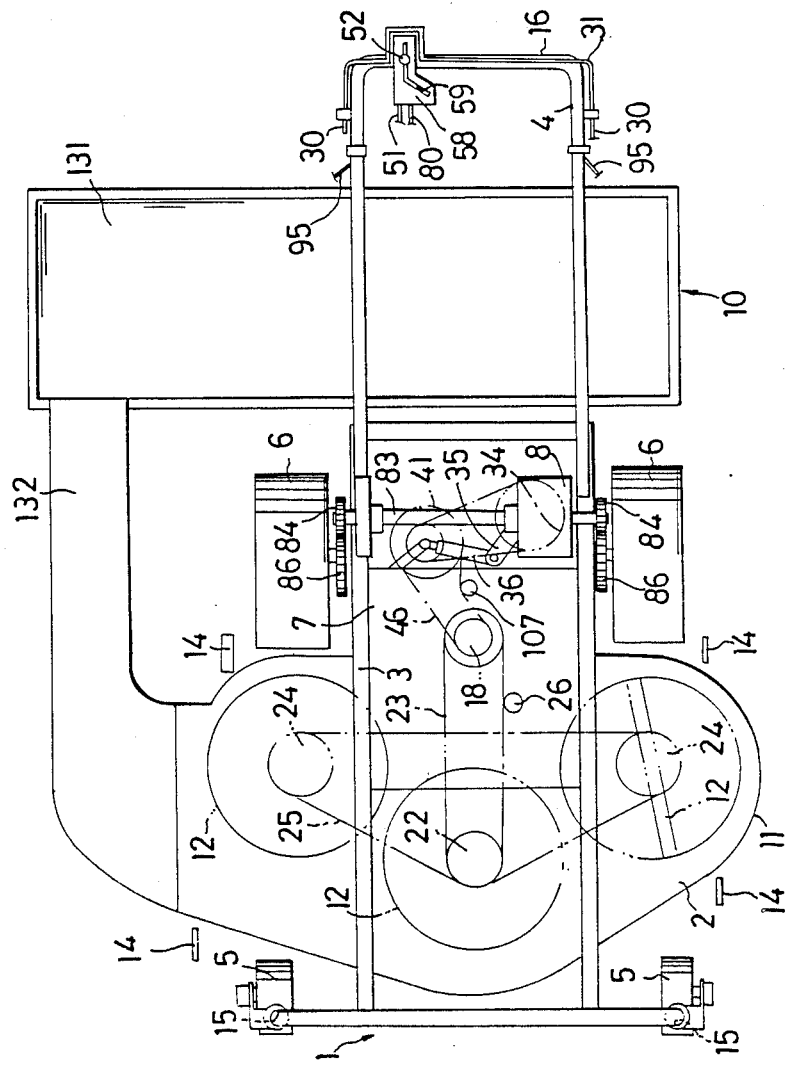
FIG. 9 is an overall plan view of a mower of the walk-behind type.

The drawings show a mower 1 of the walk-behind type embodying the present invention. With reference to FIGS. 9 and 10, the mower 1 chiefly comprises a mower body 2, machine frame 3, handle 4, front and rear wheels 5, 6, engine 7, rear wheel drive transmission case 8, fuel tank 7 and clipping container 10.

The mower body has a deck 11, and three cutting blades 12 disposed under the deck 11 and each drivingly rotatable about a vertical axis. The body 2 is suspended from the machine frame 3 by a link assembly 13 movably upwardly or downwardly and has gauge wheels 14 in contact with the ground.

The machine frame 3 is rectangular when seen from above and has a frame member projecting laterally outward from its front end. The frame member carries the front wheels 5 each rotatable about a vertical shaft 15.

The handle 4 is U-shaped when seen from above, extends upward from the rear end of the frame 3 and is bent rearward. The rear end of the handle 4 serves as a grip 16.

The engine 7 is mounted on the machine frame 3 approximately at the longitudinal midportion thereof and has a drive shaft 17 projecting downward from its bottom. Power is transmitted from the drive shaft 17 to the cutting blade 12 and the rear wheels 6 via a belt transmission.

Figure 5:
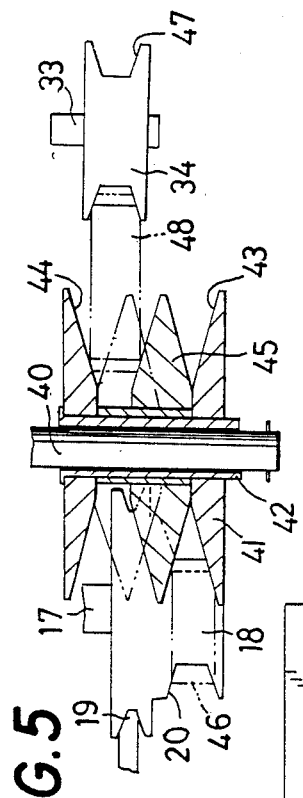
FIG. 5 is a fragmentary side elevation in section of the same.

As seen in FIG. 5, a drive pulley 18 is mounted on the drive shaft 17 rotatably therewith and has in its outer periphery a pair of upper and lower grooves 19, 20.

A cutting blade drive belt 23 is passed through the upper groove 19 in the drive pulley 18 and around a power receiving pulley 22 on a rotary shaft 21 for the central cutting blade 12 included in the three blades. Power transmission pulleys 24 are mounted on the rotary shafts for the respective cutting blades 12, with a transmission belt 25 reeved around these pulleys 24. Through the above arrangement, the cutting blades 12 are drivingly rotated by the engine 7.

Figure 3:
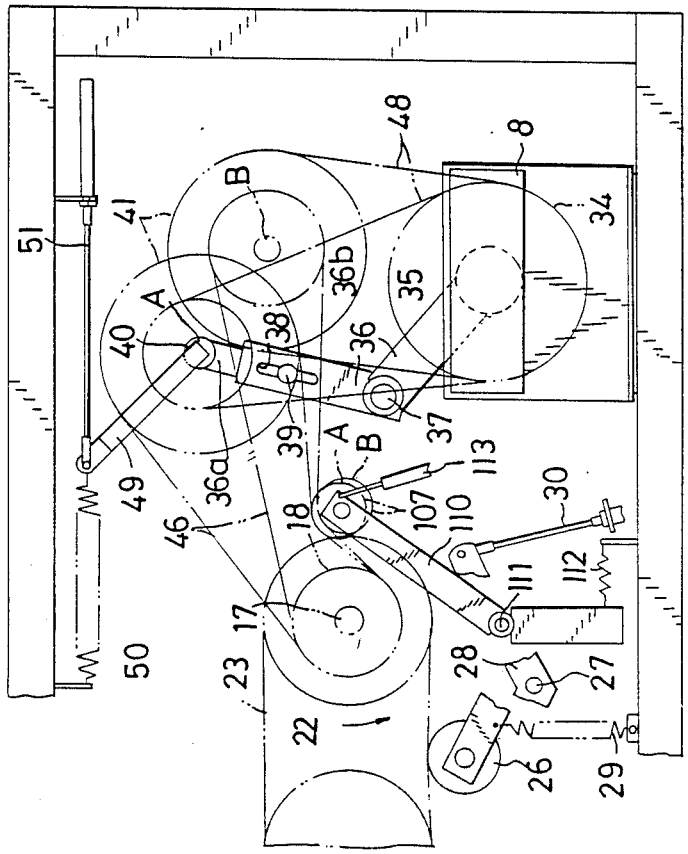
FIG. 3 is a plan view of a belt transmission for running and for driving cutting blades.

The blade drive belt 23 is usually slack without transmitting power therethrough but is tensioned for power transmission when pressed on by a cutter tension roller 26. With reference to FIG. 3, the tension roller 26 is mounted on one end of a V-shaped bracket 28 supported by a pivot 27 on the frame 3 and is biased by a spring 29 in a direction away from the belt 23. Connected to the other end of the bracket 28 is one end of a push-pull wire 30 for pivotally moving the bracket 28 to press the tension roller 26 against the belt 23. The other end of the wire 30 is coupled to a blade drive lever 31 shown in FIGS. 14 and 15. The lever 31 is U-shaped when seen from above and coextensive with the grip 16 and supported at each end by a lateral pivot 32 on the handle 4. The lever end projects upward from the pivoted portion and has attached thereto the other end of the wire 30. When the lever 31 is pivotally moved down, the tension roller 26 is pressed against the belt 23 to drive the cutting blades 12.

The rear wheel drive transmission case 8 is disposed behind the engine 7 and mounted on the machine frame 3. As seen in FIG. 6, a driven shaft 33 extends downward from the bottom of the case and carries a driven pulley 34 rotatably with the shaft 33.

Figure 4:
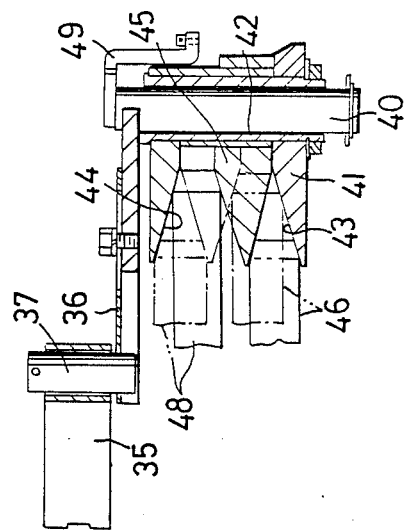
FIG. 4 is a fragmentary rear view in section of the same.

A projecting arm 35 is attached to the bottom of the case 8. As shown in FIGS. 3 and 4, a pivotal arm 36 is supported by a vertical pivot 37 on the outer end of the projecting arm 35. The pivotal arm 36 comprises two members 36a, 36b which are connected together by means of a slot 38 and a bolt 39, whereby the arm 36 is made adjustable in length. A downwardly projecting intermediate shaft 40 is attached to the forward end of the arm 36.

When the intermediate shaft 40 is moved away from one of the drive shaft 17 and the driven shaft 33 by the pivotal movement of the pivotal arm 36, the shaft 40 approaches the other shaft. An intermediate pulley 41 is mounted on the intermediate shaft 40.

The intermediate pulley 41 is made free to rotate relative to the shaft 40 by a sleeve 42 and has a first groove 43 and a second groove 44 above the first groove 43. Each of the two grooves 43, 44 has an axial width gradually decreasing radially inwardly of the pulley 41. A partition 45 provided between and defining the two grooves 43, 44 is movable axially of the shaft 40.

A first belt 46 is passed through the lower groove 20 in the drive pulley 18 and the first groove 43. A second belt 48 is passed through a groove 47 in the driven pulley 34 and the second groove 44. Thus, the rotation of the drive shaft 17 is transmitted to the driven shaft 33.

Figure 13:
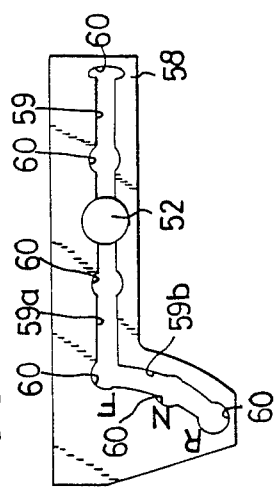
FIG. 13 is a plan view of the same.
Figure 11:
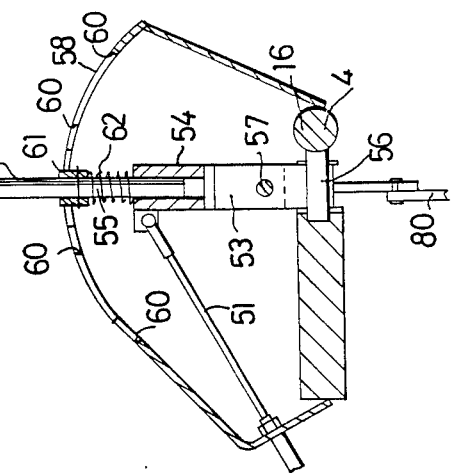
FIG. 11 is a side elevation in section of a running control lever assembly.

A control bracket 49 extends from the upper end of the intermediate shaft 40. A tension spring 50 connected between the forward end of the bracket 49 and the frame 3 biases the pivotal arm 36 in a direction to bring the shaft 40 closer to the drive shaft 17. Connected to the forward end of the control bracket 49 is one end of a push-pull wire 51 for pivotally moving the arm 36 so as to move the intermediate shaft 40 away from the drive shaft 17. The other end of the wire 51 is connected to a running control lever 52 shown in FIGS. 11 to 13.

The running control lever 52 comprises divided first, second and third members 53, 54 and 55. The first member 53 is supported by a pivot 56 projecting forward from the grip 16 of the handle 4 and is movable sidewise in opposite directions. The second member 54 is supported by a lateral pivot 57 on the first member 53 and is movable forward and rearward. The third member 55 is movably fitted in the second member 54 upwardly and downwardly and has a grip at its upper end. The control lever 52 is surrounded by a guide cover 58, with the third member 55 extending outward through a guide groove 59 in the cover 58. The guide groove 59 comprises a first guide groove 59a for guiding the forward or rearward movement of the lever 52, and a second guide groove 59a extending from the front end of the groove 59a for guiding the sidewise movement of the lever 52. Each of the grooves 59a, 59b has a plurality of enlarged portions 60. The enlarged portions 60 have such a diameter that a positioning tube 61 fixedly fitted around the third member 55 of the control lever 55 is movable through the portion 60. The tube 61 has such an outside diameter that it is not movable through the guide groove 59 except for the enlarged portions 60. The third member 55 can be resiliently depressed by virtue of a compression spring 62 provided between the tube 61 and the second member 54. When the third member 55 is depressed, the tube 61 is positioned under the enlarged portion 60, permitting the control lever 52 to move along the guide groove 59.

The other end of the push-pull wire 51 is attached to the second member 54 of the control lever 52. Consequently, the control lever 52, when shifted rearward, moves the intermediate shaft 40 away from the drive shaft 17. The forward shift of the lever 52 moves the shaft 40 toward the drive shaft 17.

Now, the control lever 52 is shifted rearward to move the intermediate shaft 40 from position A in FIG. 3 to position B away from the drive shaft 17 but toward the driven shaft 33. The tension on the first belt 46 reeved around the drive pulley 18 and the intermediate pulley 41 then tends to increase, and the tension on the second belt 48 reeved around the pulley 41 and the driven pulley 46 tends to decrease.

Consequently, a component of force occurs which acts to axially move the partition 45 toward the second groove 44 since the axial width of each of the grooves 43, 44 of the intermediate pulley 41 gradually decreases radially inwardly of the pulley. This axially moves the partition 45 toward the second groove 44, whereby the first and second belts 46, 48 as reeved around the pulley 41 are moved from the solid-line position to the phantom-line position shown in FIG. 4. This movement decreases the pitch diameter of the first groove 43 and increases the pitch diameter of the second groove 44, consequently giving an increased speed to the driven shaft 33.

Conversely, if the control lever 52 is shifted forward, bringing the intermediate shaft 40 closer to the drive shaft 17, and the speed of the driven shaft 33 is decreased.

A tension pulley 107 is in contact with the first belt 46 on the slack side thereof and is mounted on one end of a support arm 110 rotatably about a vertical axis. The support arm 110 is supported at an intermediate portion thereof by a vertical pivot 111 secured to the frame 3. A tension spring 112 has one end attached to the other end of the support arm 110 and the other end attached to the frame 3, whereby the support arm 110 is so biased in a direction as to cause the tension pulley 107 to tension the first belt 46.

A control wire 113 is attached at its one end to the above-mentioned one end of the support arm 110 and has the other end connected to an unillustrated control lever. The control lever, when manipulated, pivotally moves the support arm 110 in a direction to cause the tension pulley 107 to relieve the first belt 46 of the tension. Thus, the first belt 46 can be freed from the tension to be imparted by the tension pulley 107 before the pivotal arm 36 is moved for a speed change. This diminishes the force needed to shift the lever 52 for the movement of the pivotal arm 36, assures smooth speed change control and serves to preclude a break of wire or similar trouble.

The centers of the respective drive pulley 18, intermediate pulley 41 and driven shaft 33 are arranged not on a straight line but at the vertexes of a triangle with the intermediate pulley 41 made pivotally movable instead of a linear motion, whereby the shift of first occurrence the slack side of the first belt 46 for the speed change can be minimized. Consequently, the shift of the tension pulley 107 bearing on the slack side of the first belt 46 to be involved in a maximum speed change can be very small as represented by the positions A and B in FIG. 3. As a result, the lever can be shifted for any speed change with a constant feel in pivotally moving the tension pulley 107 biased by the spring 112.

The rotation of the driven shaft 33 thus subjected to a speed change is transmitted to the rear wheels 6 via a gear transmission 63 and a pair of steering belt transmissions 64 within the transmission case 8, whereby the speed of travel of the mower is changed.

FIGS. 6 to 8 show the gear transmission 63. The driven shaft 33 is supported by bearings 65 on the transmission case 8 and carries at its inner end a first bevel gear 66 meshing with a second bevel gear 67. The gear 67 is mounted on a support shaft 68 which is supported at its opposite ends by the case 8. The shaft 68 carries a shift gear 69 movable axially thereof. A shift fork 70 is engaged in a peripheral groove in the shift gear 69 and attached to a shift shaft 71, which is supported by bearings 72, 73 on the case 8, axially movable and biased by a spring 74 rightward in FIG. 6.

The right end, shown in FIG. 6, of the shift shaft 71 is formed in its outer periphery with three circumferential grooves 75 arranged side by side axially of the shaft. The bearing 73 has a ball 76 and biased to fit into the grooves 75, whereby the shift shaft 71 is settable in one of the three positions along the axis of the shaft. These three positions are forward, neutral and reverse positions.

A shift lever 78 attached to the left end of the shift shaft 71 has an upper end supported by a pivot 79 on the case 8 and a lower end connected to one end of a shift control wire 80. The other end of the wire 80 is connected to the lower end of the control lever 52, which when shifted sidewise in either direction, axially moves the shaft 71, causing the fork 70 to bring the shift gear 69 to the forward, neutral or reverse position.

The shift gear 69, when in the forward position, is in mesh with a transmission gear 81. When in the reverse position, the gear 69 is in mesh with a back gear 82 which is always in mesh with the transmission gear 81 on a transmission shaft 83. The shaft 83 extends outward from opposite sides of the transmission case 8 and has each end thereof positioned between the outer side of the frame 3 and the inner side of the rear wheel 6. A drive pulley 84 of the steering belt transmission 64 is mounted on the shaft end.

Figure 2:
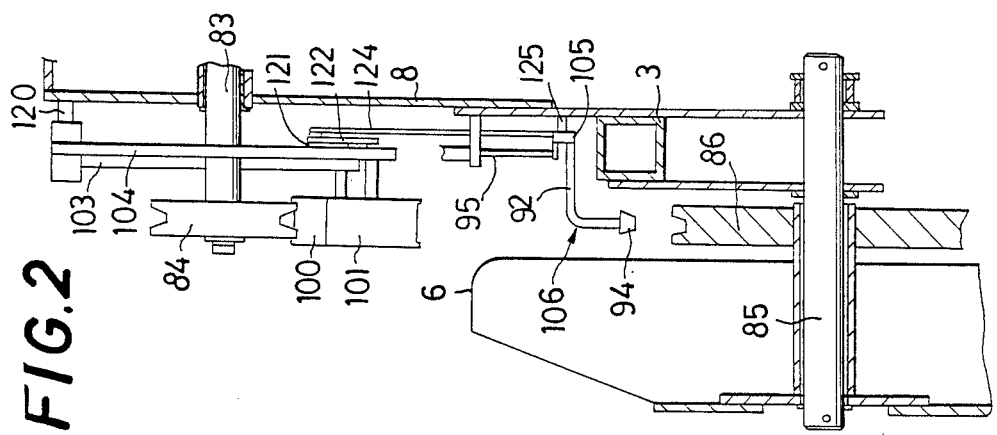
FIG. 2 is a rear view in section of the same.
Figure 1:
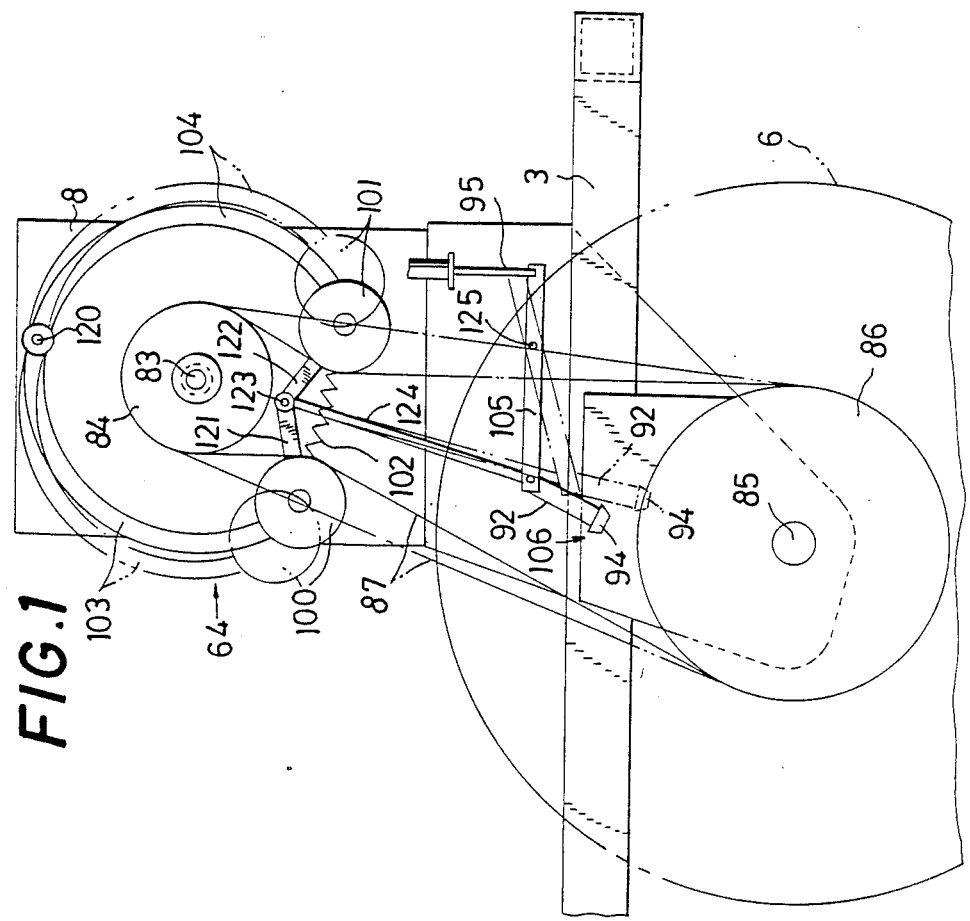
FIG. 1 is a side elevation of a steering belt transmission.

The two steering belt transmissions 64 are provided for the respective rear wheels 6. As shown in FIGS. 1 and 2, the transmission 64 comprises the drive pulley 84, a driven pulley 86 on a rear axle 85 and a transmission belt 87 reeved around the two pulleys 84, 86.

Tension pulleys 100, 101 are in contact with the taut side and the slack side, respectively, of the transmission belt 87. The pulley 100 is rotatably mounted on one end of a first link 103. The other pulley 101 is rotatably mounted on one end of a second link 104. The links 103, 104 are each in the form of a circular arc and arranged to surround the drive pulley 84. The other ends of these links are supported by a lateral pivot 120 on the side wall of the transmission case 8.

The two links 103, 104 are interconnected by a tension spring 102 at the first-mentioned ends, whereby the two tension pulleys 100, 101 are so biased as to tension the transmission belt 87.

One end of a third link 121 is pivoted to the above-mentioned one end of the first link 103 movably about a lateral axis. One end of a fourth link 122 is similarly pivoted to the above-mentioned one end of the second link 104. The other ends of the third and fourth links 121, 122 are interconnected by a lateral pivot 123. A wire 124 has one end movably connected to the lateral pivot 123 and the other end having connected thereto one end of a coupling lever (member) 105. The coupling lever 105 is supported at an intermediate portion thereof by a lateral pivot 125 on the transmission case 8. A brake bracket 92 extends from the end of the coupling lever 105 integrally therewith and is provided at its forward end with a brake shoe 94. A brake push-pull wire 95 connected at its one end to the other end of the coupling lever 105 has the other end connected to a brake lever 96 which is pivoted to the handle 4 as seen in FIG. 15.

When the brake lever 96 is gripped and thereby pivotally moved, the coupling lever 105 moves to the phantom-line position shown in FIG. 1. Through the wire 124 and the links 121, 122, 103, 104, this movement is transmitted to the tension pulleys 100, 101, which are in turn moved away from each other against the force of the spring 102 as indicated in phantom line in FIG. 1. This frees the transmission belt 87 from the tension, interrupting power transmission from the drive pulley 84 to the driven pulley 86. At the same time, the brake shoe 94 is brought into pressing contact with the driven pulley 86 as indicated in phantom line in FIG. 1, braking the driven pulley 86 in rotation and braking the rear wheel.

Figure 16:
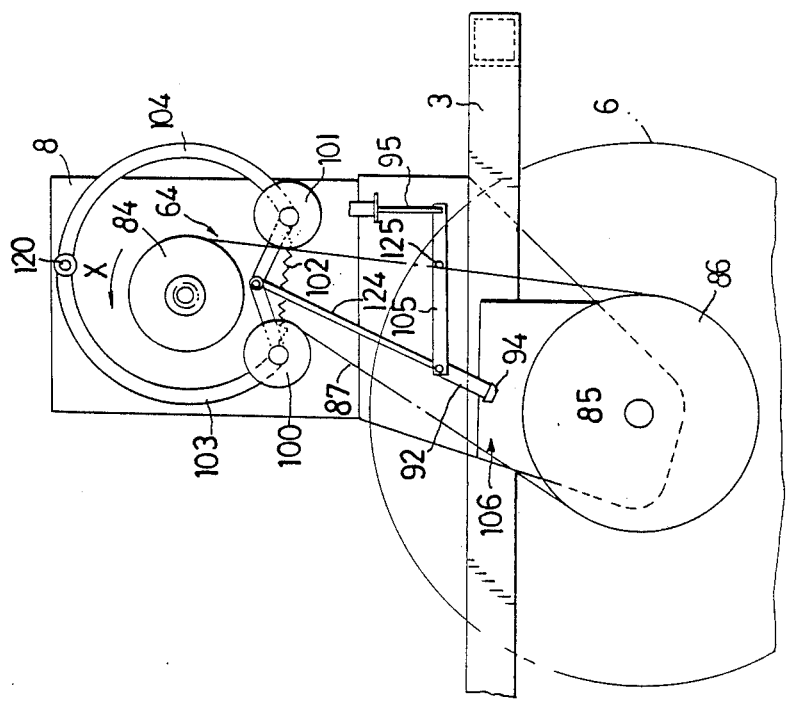
FIG. 16 is a side elevation showing the steering belt transmission during forward rotation.
Figure 17:
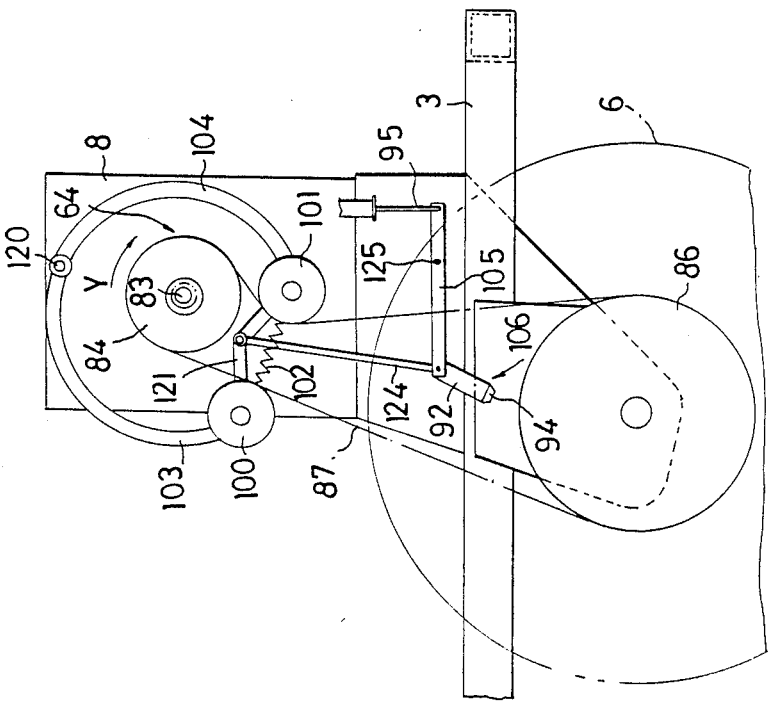
FIG. 17 is a side elevation showing the same during reverse rotation.

When the brake lever 96 is released from the hand, the brake shoe 94 is released from the pulley 86, and the transmission belt 87 is tensioned by the pulleys 100, 101. When the drive pulley 84 is forwardly rotated in the direction of arrow X as seen in FIG. 16 to advance the mower 1 forward, the right side shown of the belt 87 is tensioned with the left side thereof slackened, so that the belt 87 is bent by the tension pulleys 100, 101 by a greater amount on the left slack side. On the other hand, when the drive pulley 84 is reversely rotated in the direction of arrow Y as shown in FIG. 17 to retract the mower 1 rearward, the right side shown of the belt 87 is slackened with the left side thereof tensioned, with the result that the belt is bent by the tension pulleys 100, 101 by a greater amount on the right slack side. However, regardless of the direction of rotation of the drive pulley 84, the tension imparted to the transmission belt 87 by the tension pulleys 100, 101 biased by the force of the spring 102 is maintained at a constant value, assuring smooth transmission of torque.

With the mower 1, the control lever 52, when shifted forward or rearward, changes the speed of travel of the mower steplessly, and the lever is shiftable for the speed change without necessitating any great force. The control lever 52, when shifted sideways, effects a change to the forward, reverse or neutral position, while changeover between forward and reverse causes no trouble to the transmission of torque.

Further when the opposite brake levers 96 are pivotally moved at the same time, the mower 1 can be braked to a stop. When one of these levers is manipulated, the mower can be steered sideways.

When the cutter drive lever 31 is pivotally pushed down, the cutting blades 12 are driven for a mowing operation. The blades 12 stop when the lever is released from the depressed position.

With reference to FIG. 10 and FIG. 18, the clipping container 10 comprises a bag 130 and a rigid cover 131 covering an upper opening of the bag. A clipping duct 132 for transporting the clippings cut off by the mower body 2 is connected to the rigid cover 131. The clippings are transported from the mower body 2 to the container 10 using an air current produced by blower plates (not shown) on the cutting blades 12 and a blower (not shown) installed in an intermediate portion of the duct 132. In this case, the air flow is likely to escape through the junction between the cover 131 and the bag 130 and flow toward the face of the operator. The air will then feel unsanitary and disagreeable. The cover 131 is therefore provided with a dustproof cover 133 extending downward from its outer periphery and covering the junction between the bag 130 and the cover 131 for deflecting the air flow toward the feet of the operator. The air and fragments of clippings flowing through the vents formed in the bag 130 will then be directed also toward the operator's feet.

FIGS. 19 to 22 show steering belt transmissions 64 which are different in construction from the one already described. Throughout the drawings concerned, like parts are designated by like reference numerals, and the different features only will be described below.

Figure 19:
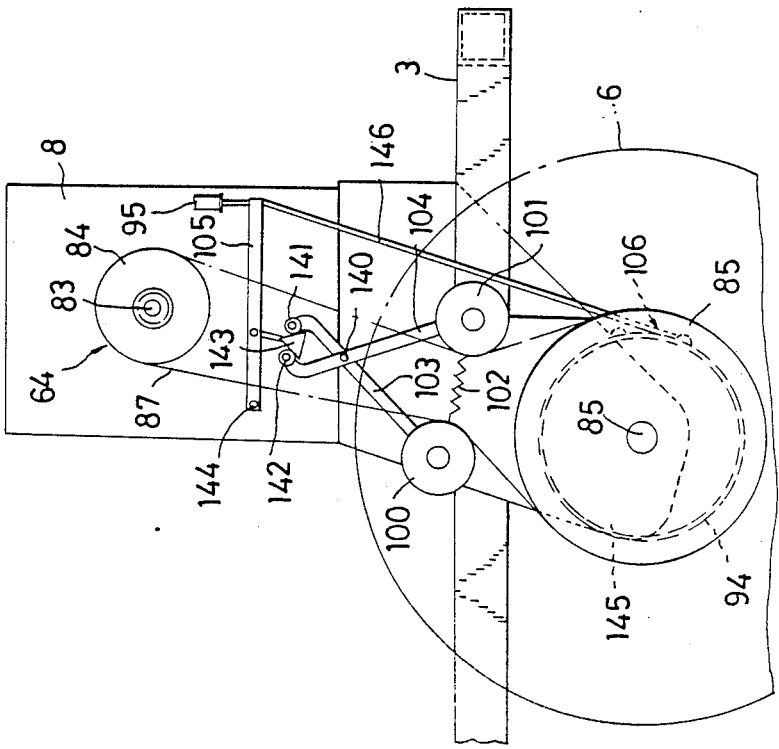

With the transmission shown in FIG. 19, a first link 103 and a second link 104 connected to tension pulleys 100, 101, respectively, intersect each other between the drive pulley 84 and the driven pulley 86 and are supported at the intersection by a lateral pivot 140 on the transmission case 8. Cam rollers 141, 142 are rotatably mounted on the upper ends of the first and second links 103, 104, respectively. A cam 143 which is generally triangular when seen from one side is positioned between and in contact with the two rollers 141, 142. The cam 143 is connected to an intermediate portion of a coupling lever 105, which is supported at its one end by a lateral pivot 144 on the transmission case 8. The brake push-pull wire 95 is connected to the other end of the lever 105.

The driven pulley 85 is provided with a brake device 106 comprising a brake drum 145 rotatable with the driven pulley 85, and a brake member 94 in the form of a band and reeved around the drum 145. The brake member 94 has one end attached to the drum side and the other end connected to one end of a brake wire 146. The other end of the brake wire 146 is connected to the other end of the coupling lever 105. The brake push-pull wire 95, when pulled, pivotally moves the coupling lever 105, thereby moving the cam 143 upward in the drawing and increasing the spacing between the two cam rollers 141, 142. The first and second links 103, 104 thereby pivotally moved relieve the transmission belt 87 of the tension imparted thereto by the tension pulleys 100, 101. At the same time, the bandlike brake member 94 is tightened up to brake the driven pulley 86.

Figure 20:
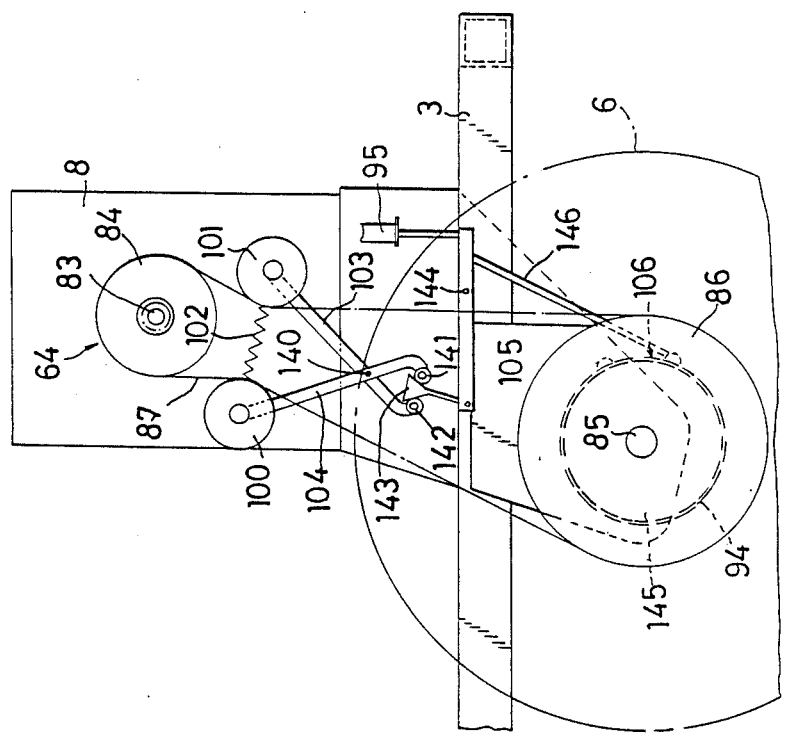

The transmission shown in FIG. 20 comprises the arrangement of FIG. 19 including the tension pulleys 100, 101, cam 143, cam rollers 141, 142 and coupling lever 105, the arrangement being provided as turned upside down. The pivot 144 for supporting the coupling lever 105 is positioned between the cam connected portion and the wire connected portion of the lever 105. The transmission of FIG. 20 has the same construction as the one shown in FIG. 19 with the exception of these features.

In the transmission of FIG. 21, the first link 103 and the second link 104 intersect each other above the drive pulley 84. The cam 143, and cam rollers 141, 142 are provided as in the arrangement of FIG. 19. The coupling lever 105 has the pivoted portion 144 and the wire connected end which are arranged in a reverse relation to those of FIG. 19 with respect to a lengthwise direction of the mower. The brake device 106, like the one shown in FIG. 19, comprises a bandlike brake member 94 and a brake drum 145. The brake member 94 is connected to the coupling lever 105 by a wire 146 and an L-shaped connecting rod 147. The transmission thus constructed operates in the same manner as the one shown in FIG. 19. The L-shaped connecting rod 147 is supported by a lateral pivot 148 on the frame 3.

With the transmission shown in FIG. 22, the spring 102 for biasing the tension pulley 100, 101 comprises two separate springs, i.e., a spring 102a for one of the tension pulleys, and a spring 102b for the other tension pulley. More specifically, the spring 102a is connected between the first link 103 and the transmission case 8. The other spring 102b is connected between the second link 104 and the case 8. The transmission has the same construction as the one shown in FIG. 20 with the exception of the above feature and operates similarly.

Although the foregoing embodiments are belt transmissions embodying the invention for use in mowers of the walk-behind type, the invention is of course not limited to such application.

What is claimed is:

1. A belt transmission including a transmission belt reeved around a reversible drive pulley and a reversible driven pulley, said transmission system comprising:
   a tension pulley provided in contact with a taut side of the transmission belt to be movable in a first direction to tension the transmission belt and in a second direction to relieve the transmission belt from the tension;
   a tension pulley provided in contact with a slack side of the transmission belt and movable in a first direction to tension the transmission belt and in a second direction to relieve the transmission belt from the tension;
   an elastic body biasing the two tension pulleys each in the belt tensioning direction;
   a first link connected to one of the tension pulleys;
   a second link connected to the other tension pulley, each of the two links being pivotally movable in a direction corresponding to the tension pulley to tension the transmission belt and in a direction corresponding to the tension pulley to relieve the tension, wherein the two links are pivotally movable about a common axis; and
   means for concurrently and selectively tensioning or relieving tension on the two tension pulleys.

2. A belt transmission as defined in claim 1 wherein the two links are pivotally movable without changing the angle thereof relative to each other when the direction of revolution of the transmission belt is changed.

3. A belt transmission as defined in claim 1 or 2, wherein the two tension pulleys are connected together by the single elastic body biasing the two tension pulleys.

4. A belt transmission as defined in claim 3, wherein a coupling member is provided to be operatively connected to the first and second links such that the two links are concurrently movable to selectively tension or relieve the belt tension by moving the coupling member.

5. A belt transmission as defined in claim 4, wherein the driven pulley is provided with a brake device having a brake member, and the brake member is operatively connected to the coupling member so that the brake member is moved toward a braking direction by the movement of the two tension pulleys in the tension relieving direction.

6. A belt transmission as defined in claim 3, wherein the driven pulley is provided with a brake device having a brake member, and the brake device is operatively connected to the two tension pulleys so that the brake member is moved toward a braking direction by the movement of the two tension pulleys in the tension relieving direction.

7. A belt transmission as defined in claim 1 or 2, wherein a coupling member is provided to be operatively connected to the first and second links such that the two links are concurrently movable to selectively tension or relieve the belt tension by moving the coupling member.

8. A belt transmission as defined in claim 1 or 2, wherein the driven pulley is provided with a brake device having a brake member, and the brake device is operatively connected to the two tension pulleys so that the brake member is moved toward a braking direction by the movement of the two tension pulleys in the tension relieving direction.

9. A belt transmission as defined in claim 1, wherein the tension pulley is mounted with one end of each of the first and the second links, and the pivoted axis common to the first and second links is located at the opposing end of the first and second links.

10. A belt transmission as defined in claim 1 or 2, wherein a coupling member is provided to be operatively connected to the first and second links such that the two links are concurrently movable to selectively tension or relieve the belt tension by moving the coupling member.

11. A belt transmission as defined in claim 5, wherein the driven pulley is provided with a brake device having a brake member, and the brake member is operatively connected to the coupling member so that the brake member is moved toward a braking direction by the movement of the two tension pulleys in the tension relieving direction.

12. A belt transmission as defined in claim 5, wherein a third link is connected to one of the tension pulleys, a fourth link being connected to the other tension pulley, the third link and the fourth link being connected together and pivotally movable relative to each other, the coupling member being operatively connected to the first link and the second link by the third link and the fourth link.

13. A belt transmission as defined in claim 12, wherein the coupling member is operatively connected to a lateral pivot member which holds the third and fourth links.

14. A belt transmission as defined in claim 1 or 2, wherein the driven pulley drives a wheel of a vehicle.

15. A belt transmission as defined in claim 14, wherein the two tension pulleys are connected together by the single elastic body biasing the two tension pulleys.

16. A belt transmission as defined in claim 14, wherein the vehicle is a mower of the walk-behind type.

17. A belt transmission as defined in claim 14, wherein a coupling member is operatively connected to the first and second links, and each of the two links is pivotally movable in the tensioning direction and the tension relieving direction by moving the coupling member.

18. A belt transmission as defined in claim 17, wherein the driven pulley is provided with a brake device having a brake member, and the brake member is operatively connected to the coupling member so that the brake member is moved toward a braking direction by the movement of the two tension pulleys in the tension relieving direction.

19. A belt transmission as defined in claim 14, wherein the driven pulley is provided with a brake device having a brake member, and the brake device is operatively connected to the two tension pulleys so that the brake member is moved toward a braking direction by the movement of the two tension pulleys in the tension relieving direction.

20. A belt transmission including a transmission belt reeved around a reversible drive pulley and a reversible driven pulley, said transmission system comprising:
  a tension pulley provided in contact with a taut side of the transmission belt to be movable in a first direction to tension the transmission belt and in a second direction to relieve the transmission belt from the tension;
  a tension pulley provided in contact with a slack side of the transmission belt and movable in a first direction to tension the transmission belt and in a second direction to relieve the transmission belt from the tension;
  an elastic body biasing the two tension pulleys each in the belt tensioning direction;
  a first link connected to one of the tension pulleys;
  a second link connected to the other tension pulley, each of the two links being pivotally movable in a direction corresponding to the tension pulley to tension the transmission belt and in a direction corresponding to the tension pulley to relieve the tension, wherein the two links are pivotally movable about a common axis; and
  means for concurrently and selectively tensioning or relieving tension on the two tension pulleys;
  wherein the driven pulley is operatively connected to drive a rear wheel of a mower of the walk-behind type, the mower having front wheels serving as gauge wheels and a handle provided at its rear portion for an operator, the drive pulley being positioned above the driven pulley.

21. A belt transmission as defined in claim 20, wherein a coupling member is provided to be operatively connected to the first and second links such that the two links are concurrently movable to selectively tension or relieve the belt tension by moving the coupling member.

22. A belt transmission as defined in claim 21, wherein the driven pulley is provided with a brake device having a brake member, and the brake member is operatively connected to the coupling member so that the brake member is moved toward a braking direction by the movement of the two tension pulleys in the tension relieving direction.

23. A belt transmission as defined in claim 22, wherein a third link is connected to one of the tension pulleys, a fourth link being connected to the other tension pulley, the third link and the fourth link being connected together and pivotally movable relative to each other, the coupling member being operatively connected to the first link and the second link by the third link and the fourth link.

* * * * *

UNITED STATES PATENT AND TRADEMARK OFFICE
CERTIFICATE OF CORRECTION

PATENT NO.  : 4,934,989

DATED       : June 19, 1990

INVENTOR(S) : Kazuo FURUKAWA, Keiichi SAMPEI, Yoshihiro KATO, Yoshito DEI and Katsumi FUKUMOTO It is certified that error appears in the above-identified patent and that said Letters Patent is hereby corrected as shown below:

ON TITLE PAGE:
  change the Assignee's name to read Kubota, Ltd.

Signed and Sealed this

Twenty-second Day of October, 1991

Attest:

HARRY F. MANBECK, JR.

*Attesting Officer*            *Commissioner of Patents and Trademarks*